United States Patent [19]
Park et al.

[11] Patent Number: 5,635,987
[45] Date of Patent: Jun. 3, 1997

[54] METHOD OF AN APPARATUS FOR DISPLAYING TELETEXT INFORMATION FOR A WIDE-SCREEN TELEVISION RECEIVER

[75] Inventors: Man H. Park, Gwacheon; Jin H. Cho, Seoul; Sung Y. Meng, Yuiwang, all of Rep. of Korea

[73] Assignee: Goldstar Co., Ltd., Seoul, Rep. of Korea

[21] Appl. No.: 671,809

[22] Filed: Jun. 25, 1996

Related U.S. Application Data

[63] Continuation of Ser. No. 360,361, Dec. 21, 1994, abandoned.

[30] Foreign Application Priority Data

Dec. 21, 1993 [KR] Rep. of Korea ............... 93-28821
Dec. 21, 1993 [KR] Rep. of Korea ............... 93-28822
Dec. 24, 1993 [KR] Rep. of Korea ............... 93-29482

[51] Int. Cl.$^6$ .................................................. H04N 7/087
[52] U.S. Cl. ............... 348/468; 348/564; 348/565; 348/586; 348/461; 348/143
[58] Field of Search ............................. 348/554, 556, 348/564, 565, 567, 468, 465, 461, 445, 584, 588, 589; H04N 7/087, 7/08, 7/00, 5/445, 5/45, 5/46, 5/44

[56] References Cited

U.S. PATENT DOCUMENTS

| | | | |
|---|---|---|---|
| 4,701,794 | 10/1987 | Fröling et al. | 348/468 |
| 5,008,750 | 4/1991 | Gomikawa | 348/468 |
| 5,036,394 | 7/1991 | Morii et al. | 348/468 |
| 5,038,212 | 8/1991 | Van Den Hombergh et al. | 358/142 |
| 5,208,671 | 5/1993 | Tarrant | 358/247 |
| 5,231,493 | 7/1993 | Apitz | 348/468 |
| 5,237,411 | 8/1993 | Fink et al. | 358/146 |
| 5,373,324 | 12/1994 | Kuroda et al. | 348/468 |

FOREIGN PATENT DOCUMENTS 4031213  1/1992  Germany .............. H04N 7/087

*Primary Examiner*—John K. Peng
*Assistant Examiner*—Nathan J. Flynn
*Attorney, Agent, or Firm*—Jacobson, Price, Holman & Stern, PLLC

[57] ABSTRACT

A teletext information displaying method and the apparatus therefor for a wide-screen television receiver by which both the list and the contents of received teletext pages are displayed on a 16×9 A.R. screen, so that a user can easily find desired teletext information without the necessity of individually entering page data for page search. According to the present method and apparatus, teletext page data being received is stored in a first memory, and the list of the stored pages is created and stored in a second memory. The page list and the contents thereof are selectively displayed on a 4×3 A.R. region and a remainder region of the 16×9 A.R. screen. Also, when the channel is selected, information on the teletext pages having been received and stored and the teletext type are displayed for a predetermined time with a television picture, thereby providing convenience in use.

6 Claims, 13 Drawing Sheets

METHOD OF AN APPARATUS FOR DISPLAYING TELETEXT INFORMATION FOR A WIDE-SCREEN TELEVISION RECEIVER

This application is a continuation of application Ser. No. 08/360,361, filed Dec. 21, 1994, now abandoned.

BACKGROUND OF THE INVENTION

1. Field of the Invention

The present invention relates to a method of and an apparatus for displaying teletext information for a wide-screen television receiver. More particularly, the present invention relates to a teletext information displaying method and an apparatus therefor which can selectively display desired teletext information on a screen having a 16×9 aspect ratio.

2. Description of the Prior Art

A wide-screen television receiver has a display screen having an aspect ratio (A.R.) of 16×9, and a user can enjoy watching television as if the user was watching a movie in a theater.

Figure 1:
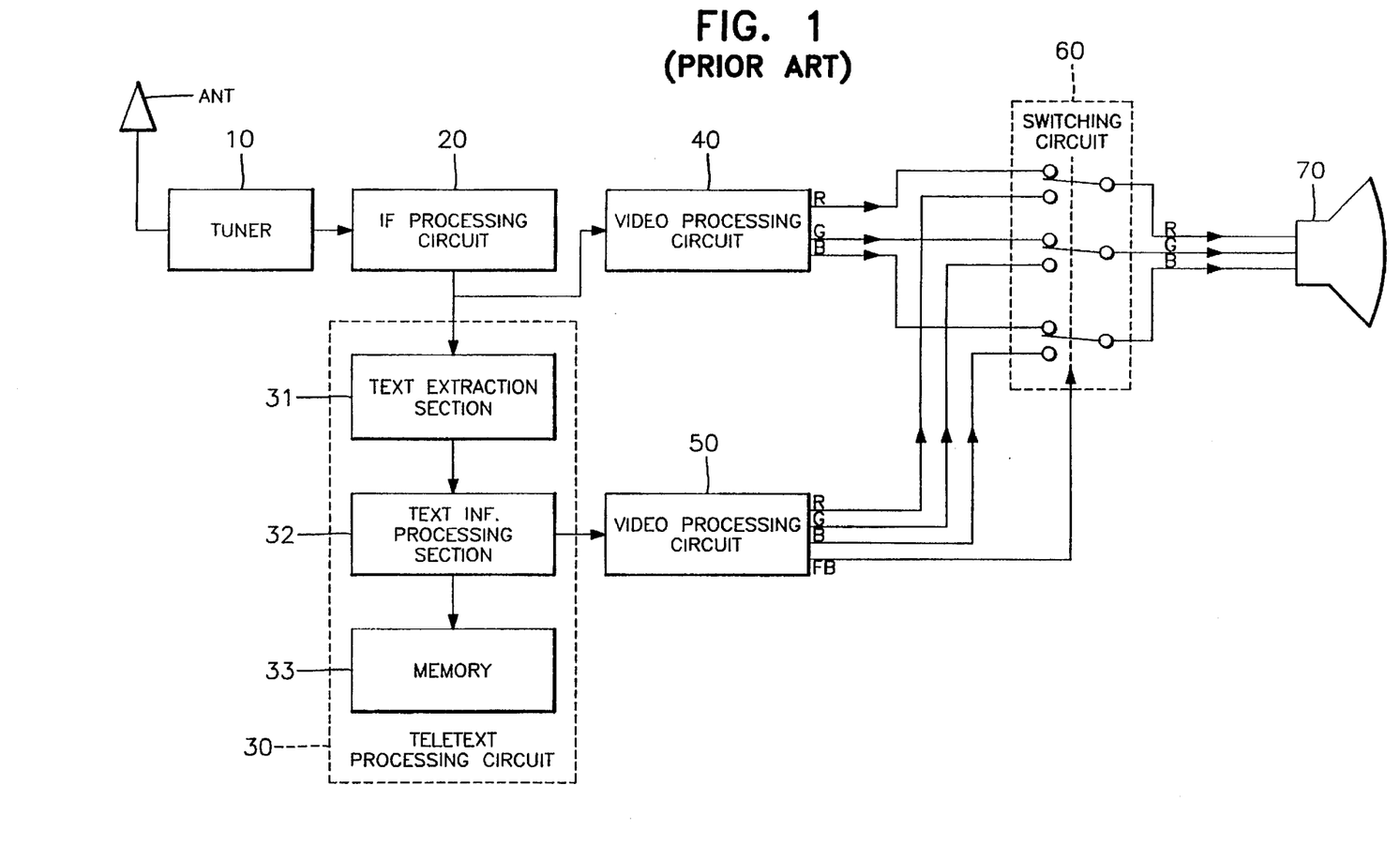
FIG. 1 is a block diagram of a conventional teletext information displaying apparatus employed in a wide-screen television receiver.

FIG. 1 is a block diagram of a conventional apparatus for displaying teletext information, employed in a wide-screen television receiver. According to the apparatus of FIG. 1, a composite video signal, which is received through an antenna ANT and then inputted to a tuner 10, is converted into an intermediate frequency (IF) signal in an intermediate frequency processing circuit 20. The IF composite video signal from the IF processing circuit 20 is converted into R, G, and B color signals in a video processing circuit 40, and the R, G, and B signals are supplied to a switching circuit 60.

Also, the IF composite video signal outputted from the IF processing circuit 20 is supplied to a teletext extraction section 31 in a teletext processing circuit 30 and a teletext signal (i.e., character signal) is extracted from the composite video signal by the teletext extraction section 31. The extracted teletext signal is decoded by a teletext information processing section 32 and the decoded teletext signal is supplied to a character generator 50. At the same time, the teletext information decoded by the teletext information processing section 32 is stored in a memory 33.

If data for displaying a certain page of the teletext information is inputted to the teletext processing circuit 30, the teletext information processing section 32 scans the inputted data and provides the same to the character generator 50. The character generator 50 outputs to the switching circuit 60 R, G, and B signals for displaying the teletext information in accord with the current television display format and a switching control signal FB for controlling the operation of the switching circuit 60. The teletext signal is thereby displayed on a cathode ray tube 70.

Figure 2:
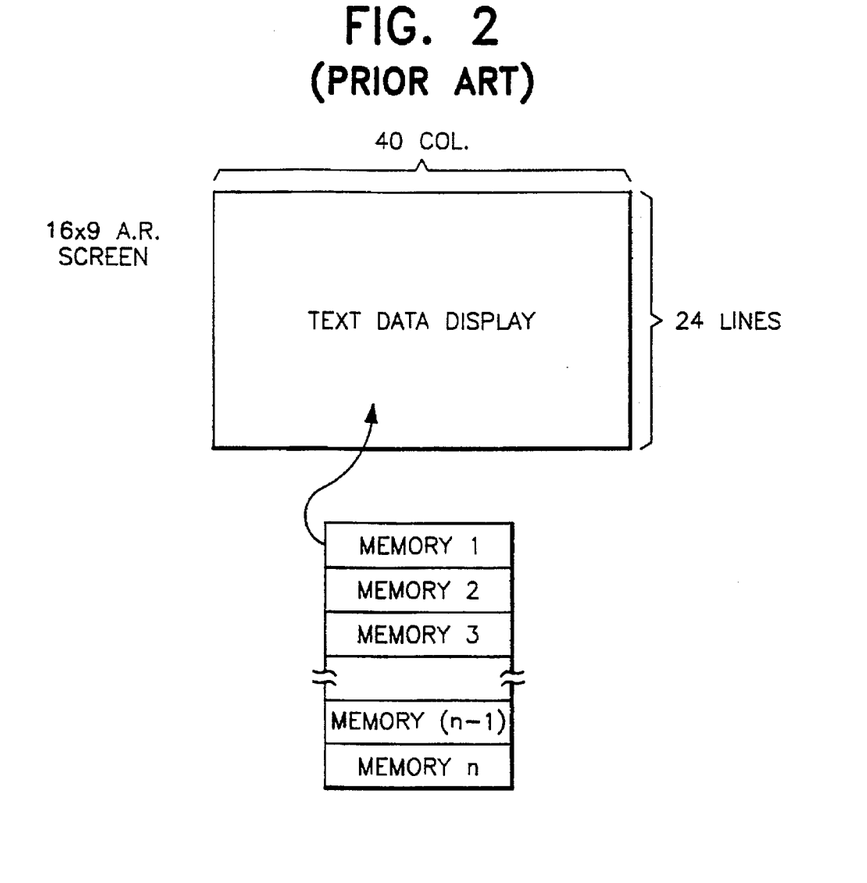
FIG. 2 is a view showing the display format of the character generator in FIG. 1

The character generator 50, under the control of a system controller (microcomputer, not illustrated), outputs R, G, and B signals of the teletext page selected among the pages of the teletext data stored in the memory as shown in FIG. 2, and thus the information of the corresponding page is displayed on the cathode ray tube 70 with the size of 40 columns×24 lines.

However, the conventional teletext information displaying method or apparatus as described above has the disadvantage that when the teletext information having a 4×3 A.R. is displayed on a 16×9 A.R. screen, the teletext picture is distorted by expansion in the horizontal direction.

Figure 3:
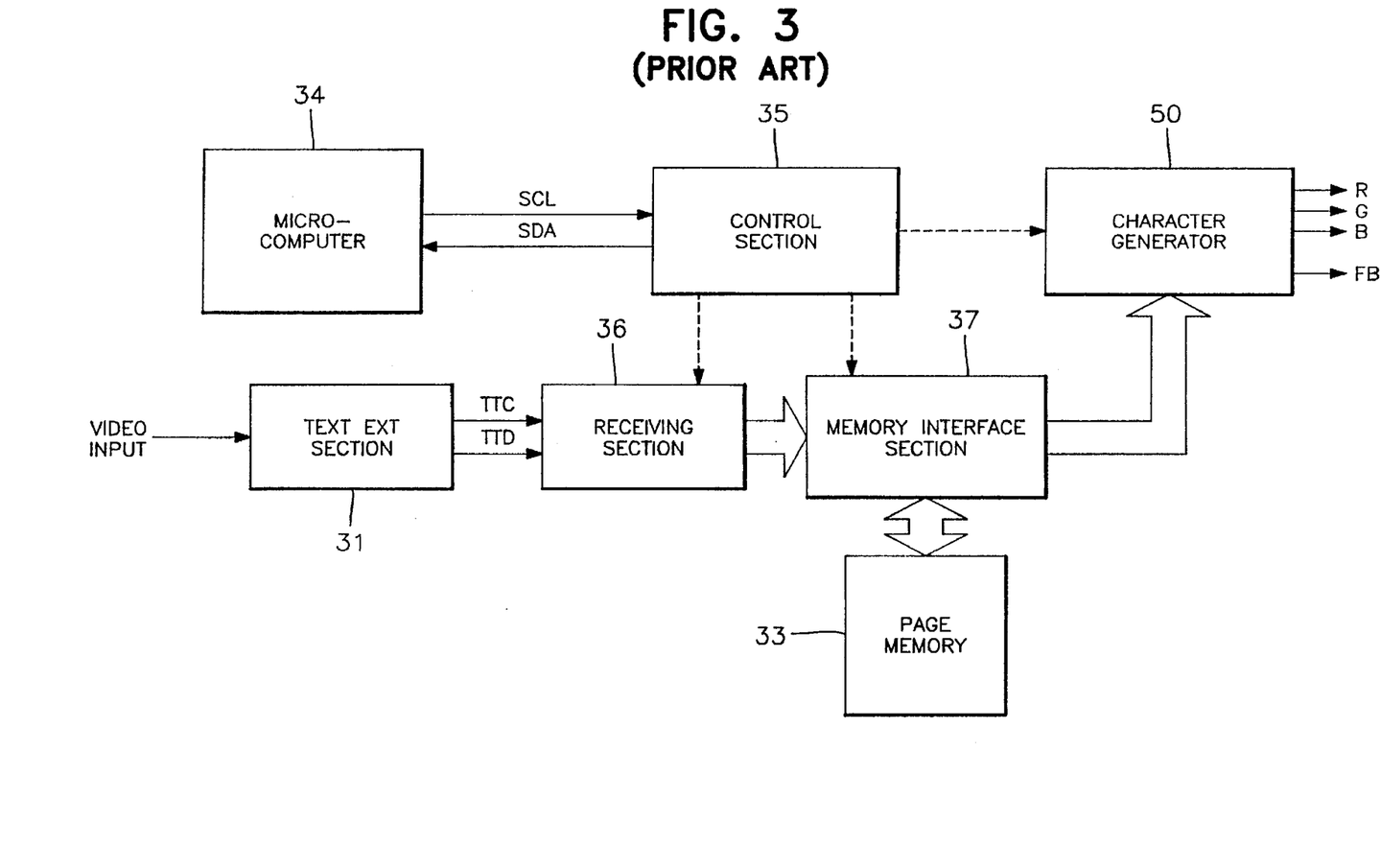
FIG. 3 is a block diagram of another conventional teletext information displaying apparatus for a wide-screen television receiver.
Figure 4:
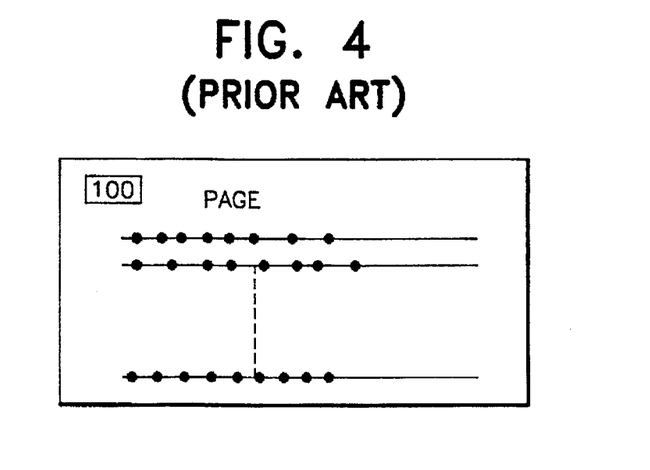
FIG. 4 is a view showing a teletext page displayed on a screen by the apparatus of FIG. 3.

Meanwhile, FIG. 3 is a block diagram of another conventional apparatus for displaying teletext information for a wide-screen television receiver. A teletext page received and processed by the apparatus of FIG. 3 is displayed on a screen as shown in FIG. 4.

Referring to FIG. 3, if a user enters a desired page information data, a microcomputer 34 receives (i.e., scans) the entered data and supplies command data for displaying the corresponding teletext page data to a control section 35.

If the display command data is inputted from the microcomputer 34, the control section 35 supplies the teletext page data to a receiving section 36 so that the receiving section 36 receives a teletext code and the teletext data outputted from a teletext extraction section 31 which extracts the teletext signal included in an input video signal. At the same time, the control section 35 supplies write/read data to a memory interface section 37 so that the teletext page data received through the memory interface section 37 is stored in or read out from a page memory 33. Accordingly, the input teletext page data is supplied to the character generator 50, so that the teletext page data is displayed on the full screen as shown in FIG. 4.

However, the conventional teletext information displaying apparatus as described above has the drawback that a user must continually enter page information data in order to search teletext pages.

SUMMARY OF THE INVENTION

It is an object of the present invention to provide a teletext information displaying method for a wide-screen television receiver which can display both the contents and information of a received teletext page on a screen so that a user can easily find desired teletext information.

It is another object of the present invention to provide a teletext information displaying apparatus for a wide-screen television receiver and a method thereof which enables a user to easily search a desired page of teletext without individual input of page information data. The user can conduct such search by displaying received teletext pages as an array on a screen and by enlarging and displaying a page selected by moving a cursor on an auxiliary region of the screen.

It is still another object of the present invention to provide a teletext information displaying method for a wide-screen television receiver which enables a user to recognize whether teletext pages are stored or not, the teletext type by displaying information on the teletext pages which has been received and stored, and the teletext type when a channel is selected.

In one aspect of the present invention, there is provided a teletext information displaying method for a wide-screen television receiver, comprising the steps of:

resetting an input page number and checking whether the corresponding teletext page is received when a page number is inputted;

storing the page in a memory 1 when the page is received at the input page checking step and resetting an information page;

checking whether the information page reset at the information page resetting step is received or not, decoding the information page if the information page is received, and forming and storing in a memory n+1 a display page; and displaying the page stored in the memory 1 at the information page resetting step on a 4×3 A.R. region of a 16×9 A.R. screen, and displaying the display page stored in the memory n+1 on a remainder region of the 16×9 A.R. screen.

In another aspect of the present invention, there is provided a teletext information displaying apparatus for a wide-screen television receiver, comprising:

a teletext extractor for extracting a teletext signal included in an input video signal;

means for receiving a page among pages provided from said teletext extractor in accordance with a control signal provided from a control means which is controlled by a system controller;

a memory interface means for storing the page data received by said receiving means in a first memory under the control of said control means, and storing a page list created by an provided from said system controller in a second memory; and a switching means for selecting data corresponding to the page list and the contents thereof read out from said first and second memories, and providing the selected data to a character generator.

In still another aspect of the present invention, there is provided a teletext information displaying method for a wide television receiver, comprising the steps of:

discriminating whether teletext pages are received if a page search is demanded by a user, displaying a "NO TELETEXT" message if the teletext pages are not received, receiving and storing in a memory the teletext pages if the teletext pages are received, crating a page list and displaying the page list on a 4×3 A.R. region of a 16×9 A.R. screen and a first teletext page in the page list on a remainder region of the 16×9 A.R. screen;

displaying the page selected by movement of a cursor on the list at each display step on the remainder region of the 16×9 A.R. screen;

displaying the selected page on the full 16×9 A.R. screen if enlargement of the page is demanded by the user at each display step, and finishing the page search; and stopping the page search if page search finish data is inputted at each display step, and switching over to a television mode for displaying an input video signal.

In still another aspect of the present invention, there is provided a teletext information displaying method for a wide-screen television receiver, comprising the steps of:

searching input teletext pages when a channel is selected, and ascertaining whether the teletext pages are received;

analyzing and detecting the teletext type of the teletext pages if the teletext pages are ascertained to be received at the page ascertaining step;

determining the page to be received and a position in a memory according to the teletext type detected at the teletext type detection step, and storing the received page in the memory;

judging whether the page to be stored at the page storing step is received;

increasing a memory count value if the page is received at the received page judgement step and then comparing the increased memory count value with the maximum value of memory count; and displaying the current teletext type and page receiving level for a predetermined time and then clearing and displayed teletext type and page receiving level from the screen.

BRIEF DESCRIPTION OF THE DRAWINGS

The above objects and other features of the present invention will become more apparent by describing the preferred embodiments thereof with reference to the accompanying drawings in which.

DETAILED DESCRIPTION OF THE PREFERRED EMBODIMENTS

The teletext information displaying method according to one embodiment of the present invention will now be explained in detail with reference to FIGS. 1, 5A to 5C, and 6B.

Referring to FIG. 1, a composite video signal (i.e., RF signal) received through an antenna ANT is converted into an intermediate frequency (IF) signal in an intermediate frequency (IF) processing circuit 20 after passing through a tuner 10. The IF composite video signal outputted from the IF processing circuit 20 is converted into R, G, and B color signals in a video processing circuit 40 and the R, G, and B signals are outputted to a cathode ray tube 70 through a switching circuit 60 to be displayed thereon.

Figure 6A:
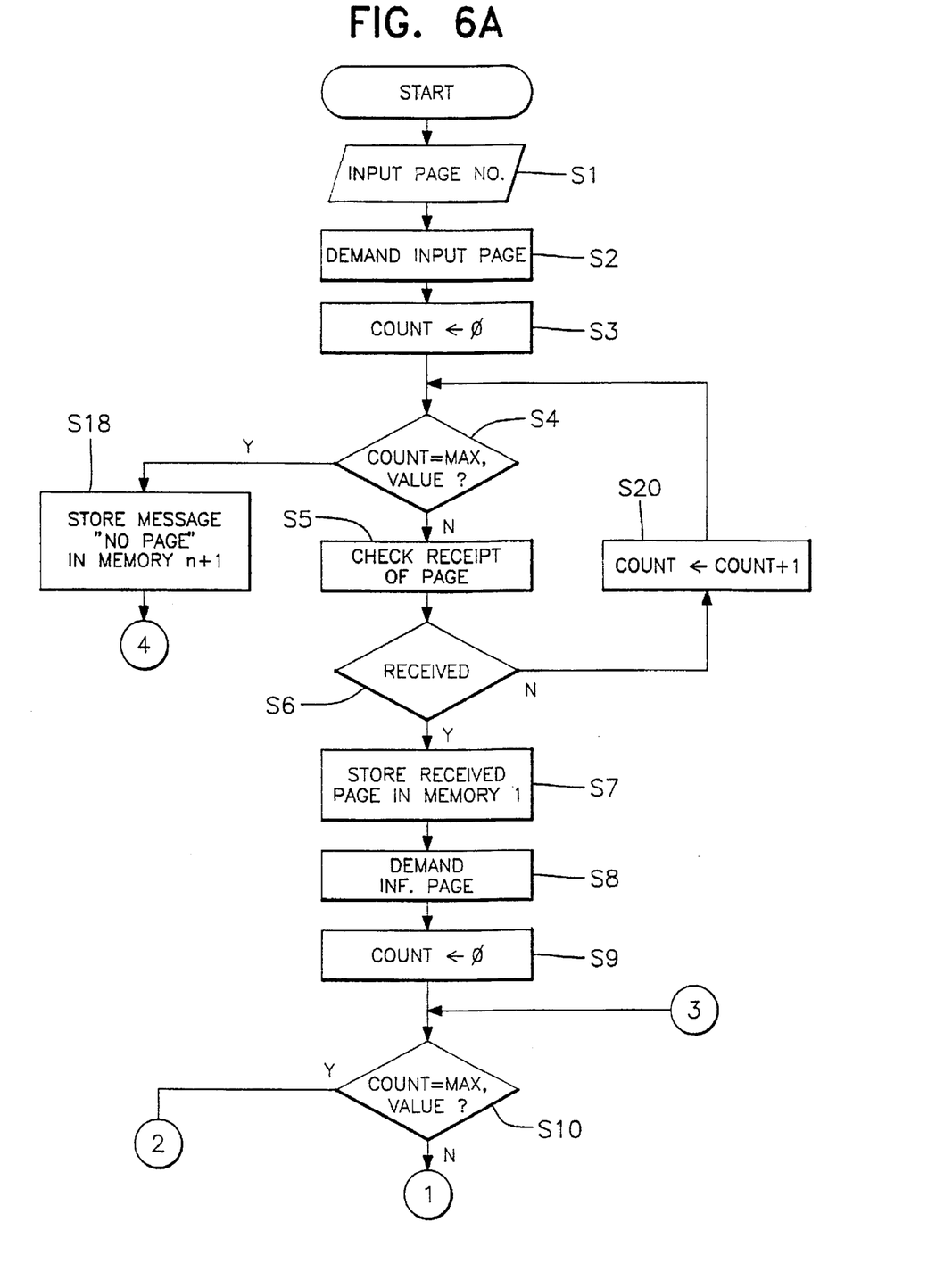
FIGS. 6A and 6B are algorithmic diagram explaining the teletext information displaying method according to one embodiment of the present invention.
Figure 6B:
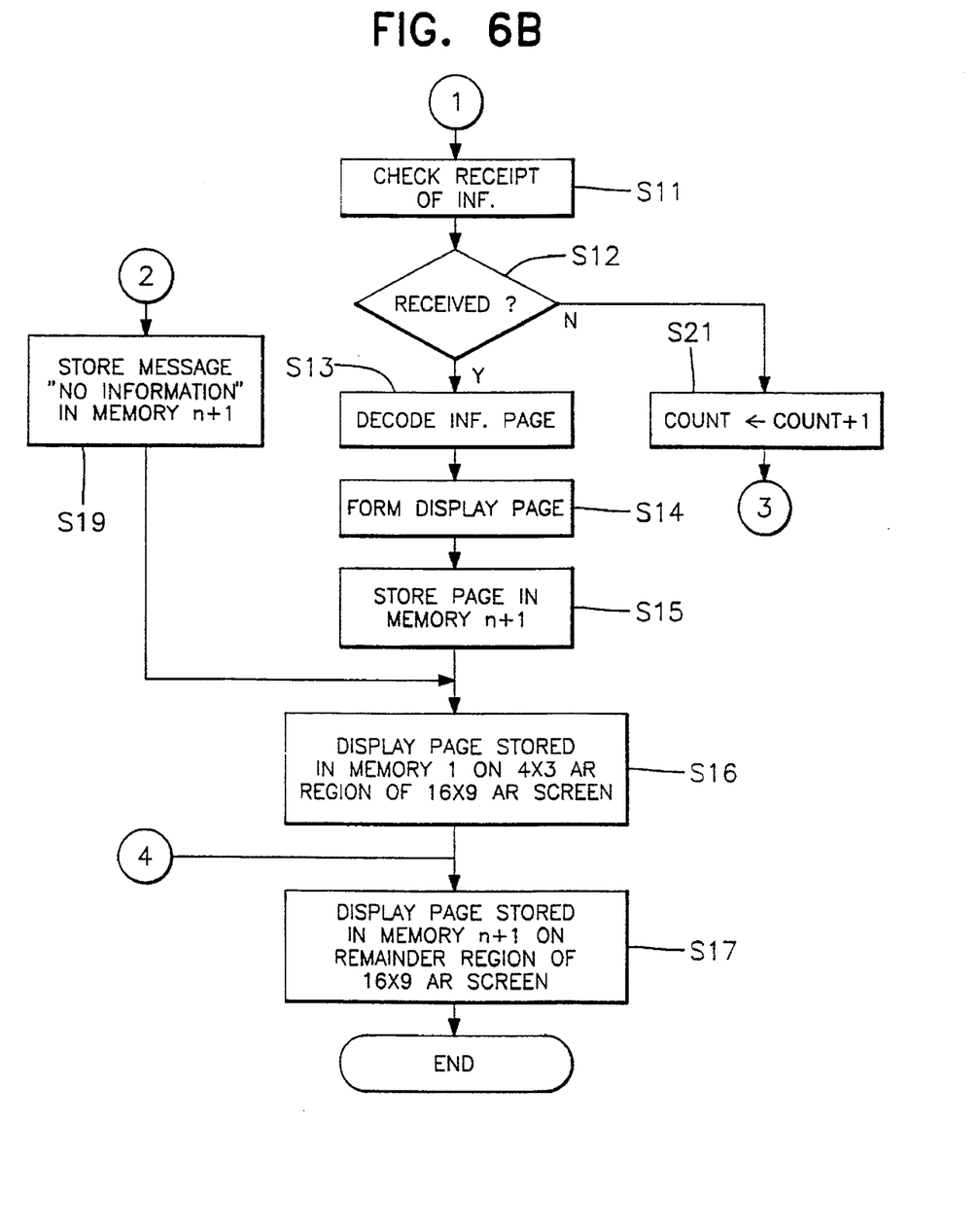

Referring to FIGS. 1, 6A, and 6B, if the user enters a page number (step S1), the input page (step S2) is reset by the teletext information circuit 30, and then a counter in the teletext information processing section 32 is cleared as "0" (step S3). Thereafter, counting is performed and while the counted value becomes the maximum value (step S4), it is checked and determined whether the input page is received (steps S5 and S6).

If the input page is received, the received page is stored in a page memory 1 in a memory section 33 (step S7), an information page is reset (step S8), and then the counter is cleared (step S9).

After the counter is cleared as mentioned above, a counting operation is performed to reach the maximum value (step S10). At this time, it is checked and determined whether the information page is received (steps S11 and S12). For example, if the information page is received, and received information page is decoded (step S13), a display page is formed (step S14), and the formed display page is stored in a page memory n+1 in the memory section 33 (step S15).

Figure 5A:
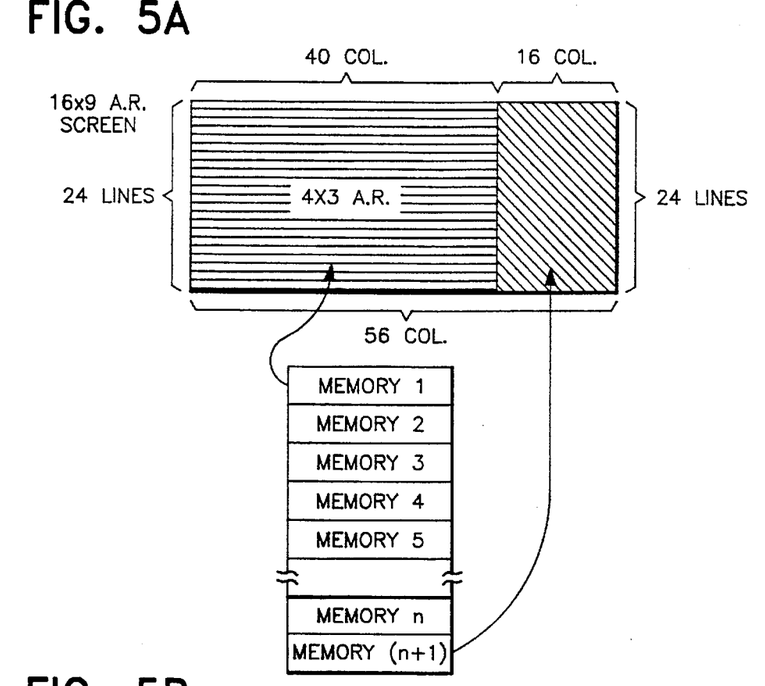
FIGS. 5A to 5C are views showing the teletext information having a 4×3 A.R. displayed on a 16×9 A.R. screen by the teletext information displaying method according to one embodiment of the present invention.
Figure 5B:
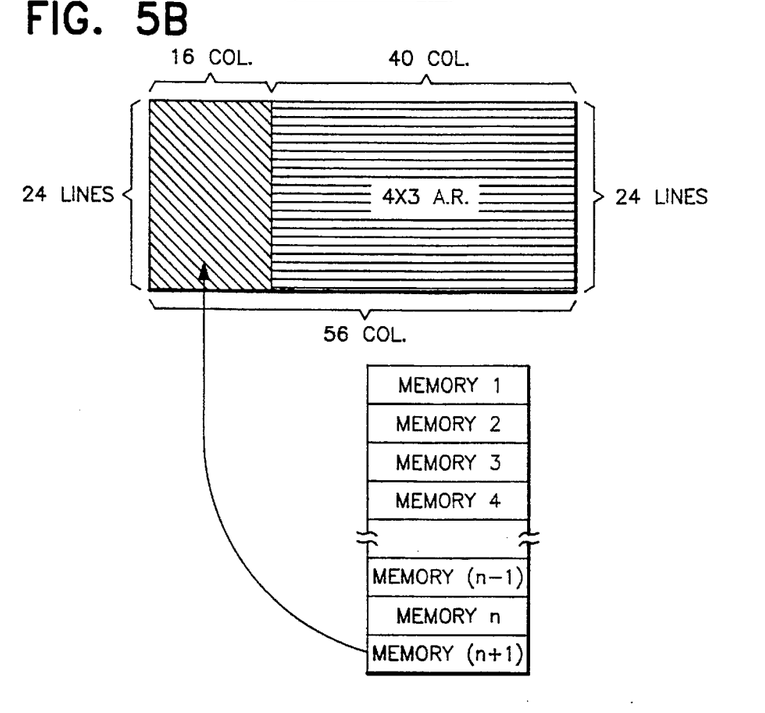
Figure 5C:
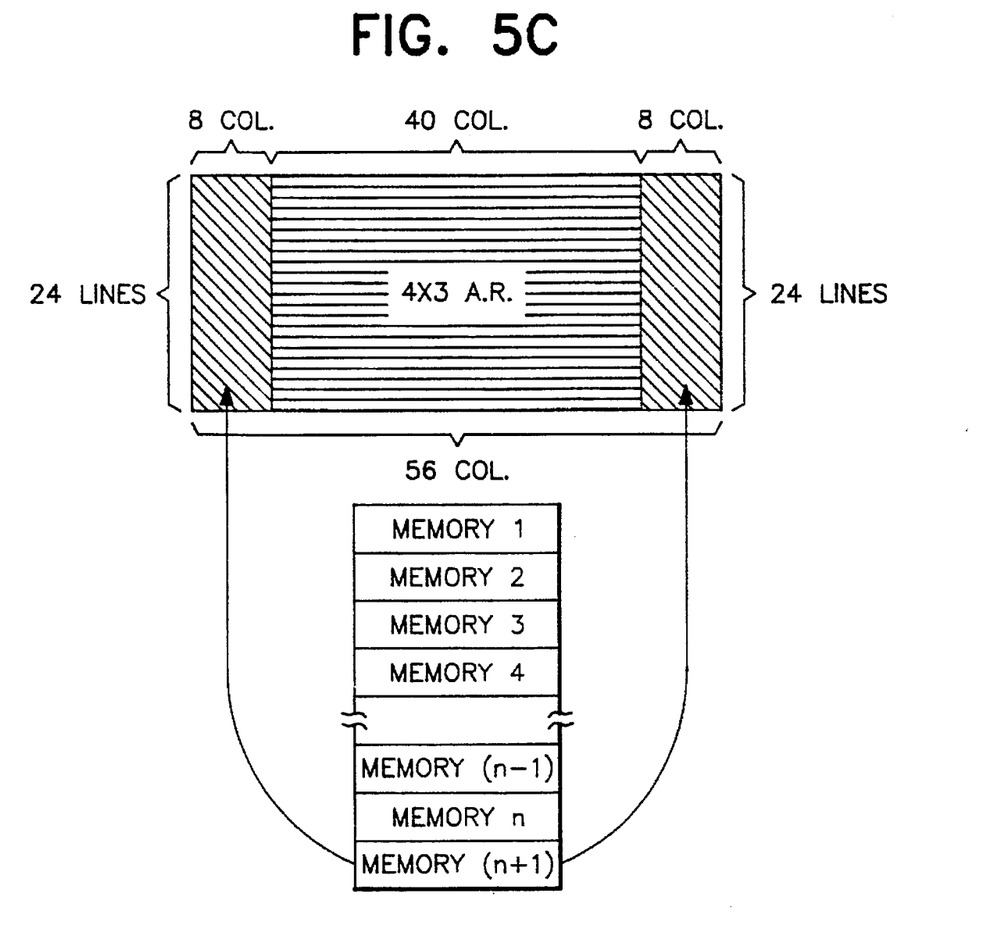

After the storing of the information page in the page memory is completed, the page stored in the memory 1 is displayed on the 4×3 A.R. region of the 16×9 A.R. screen (step S16) as shown in FIGS. 5A to 5C, and the display page stored in the memory n+1 is displayed on the remainder region of the 16×9 A.R. screen (step S17).

Meanwhile, if the counted value reaches the maximum value at step S4, a "NO PAGE" message is stored in the memory n+1 (step S18), and then entered to step S7. Also, if the page is not received at step S6, the counted value of the counter is increased by 1 (step S20), and then returned to step S4. If the information page is not received at step S12, the counted value of the counter is increased by 1 (step S21) and then returned to step S10 for checking receipt of the information page.

Next, the teletext information display method and apparatus according to another embodiment of the present invention will be explained in detail with reference to FIGS. 7, 8A to 8D, 9a, and 9B.

Figure 7:
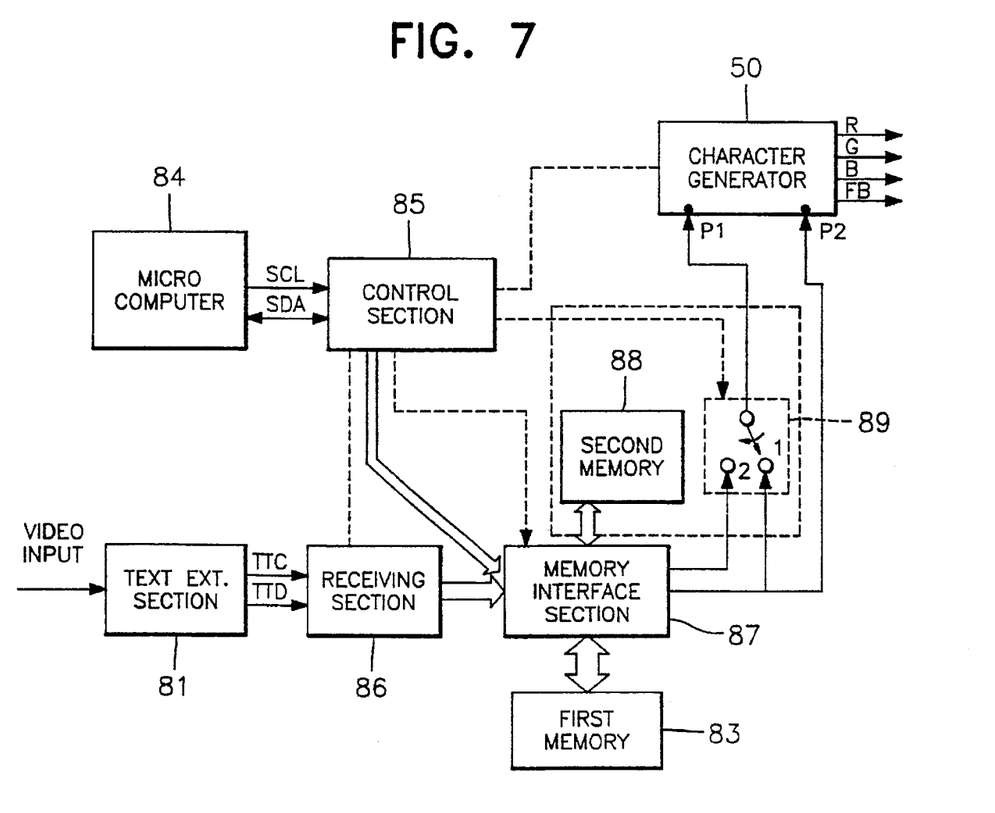
FIG. 7 is a block diagram of the teletext information displaying apparatus according to another embodiment of the present invention.
Figure 8A:
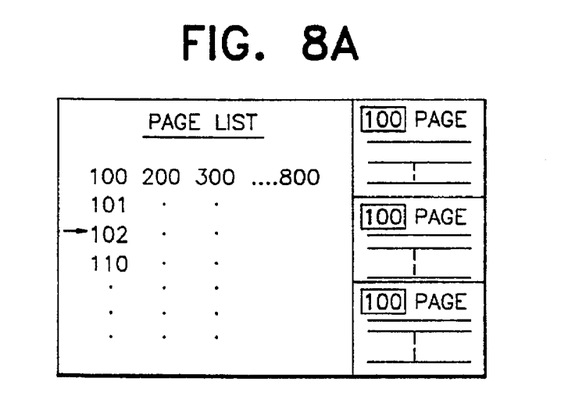
FIGS. 8A to 8D are views showing the teletext pages displayed on a 16×9 A.R. screen by the teletext information display method and the apparatus therefor according to another embodiment of the present invention.
Figure 8B:
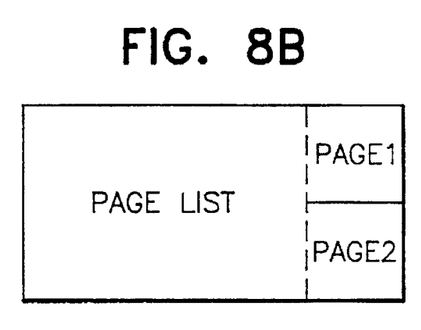
Figure 8C:
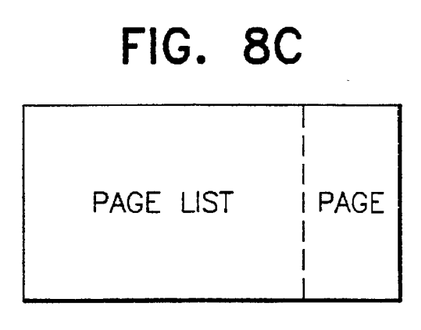
Figure 8D:
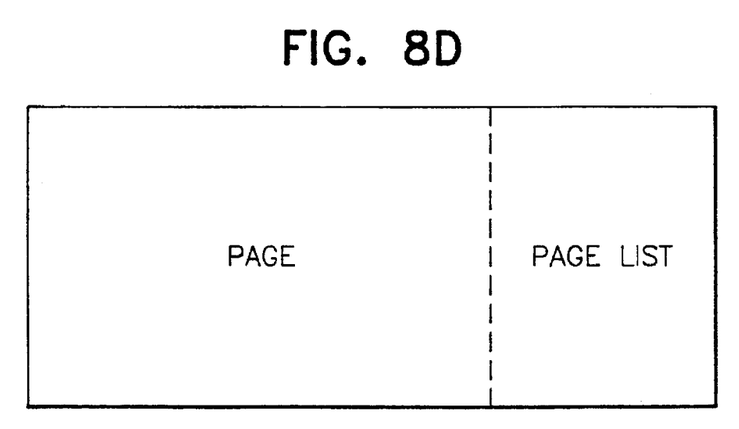

Referring to FIG. 7, a teletext extraction section 81 extracts a teletext signal included in an input video signal and supplies the extracted teletext signal to a receiving section 86. The receiving section 86 receives one page among pages outputted from the teletext extraction section 81 in accordance with output data of a control section 85 the operation of which is controlled by a microcomputer 84 (step S15).

A memory interface section 87 stores page list data created by and outputted from the microcomputer 84 in a second page memory 88 in accordance with the output data of the control section 85. The page list data stored in the second memory 88 is then read out therefrom and outputted to a character generator 50.

A first memory 83 stores the contents of the page transmitted to the memory interface section 87 in accordance with the control data outputted from the control section 85. The switching section 89 selects data corresponding to the page list and the contents thereof outputted from the first and second memories 83 and 88, and provides the data to the character generator 50.

Figure 9A:
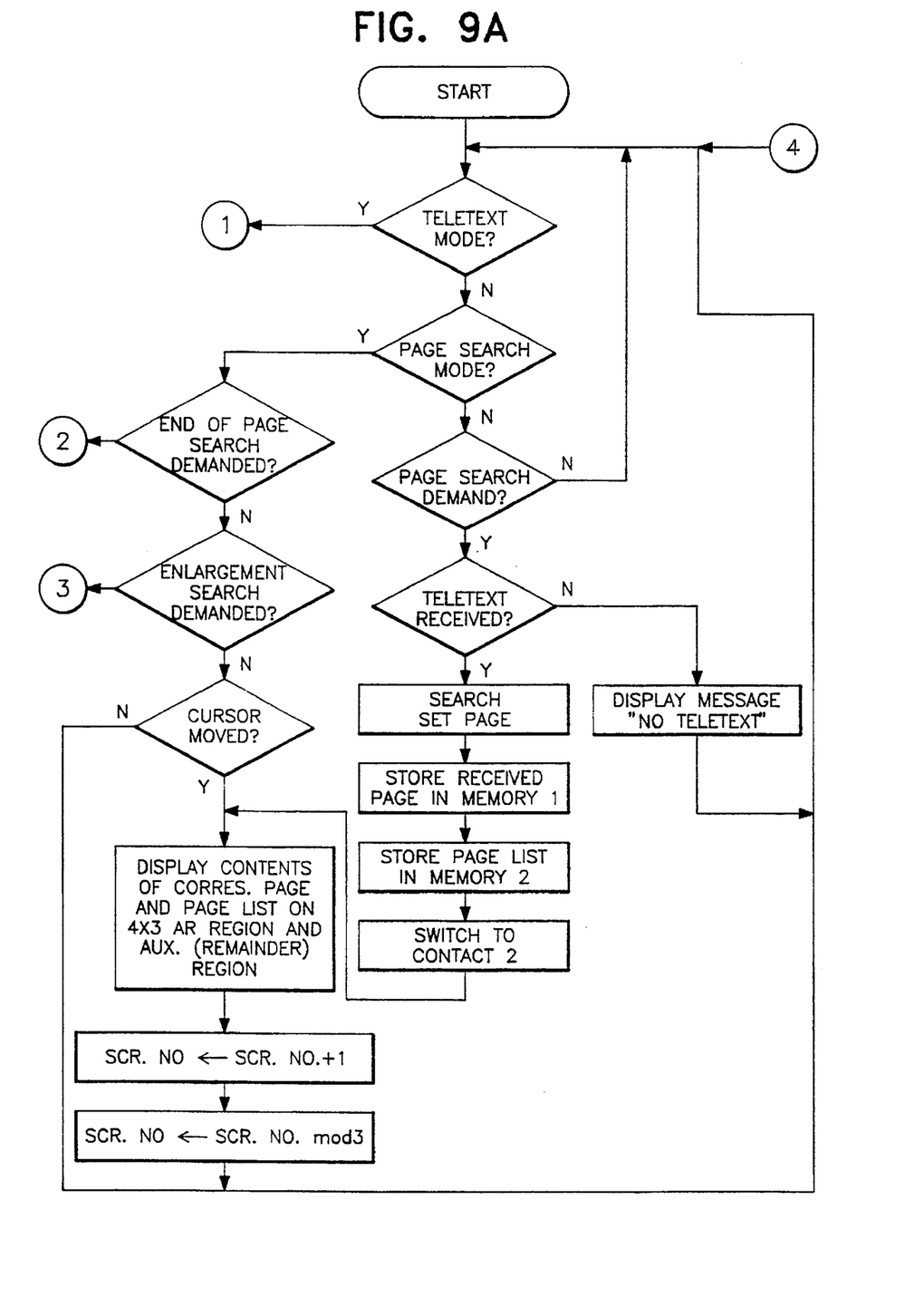
FIGS. 9A 9B 9C and 9D are algorithmic diagrams explaining the teletext information displaying method according to another embodiment of the present invention.
Figure 9B:
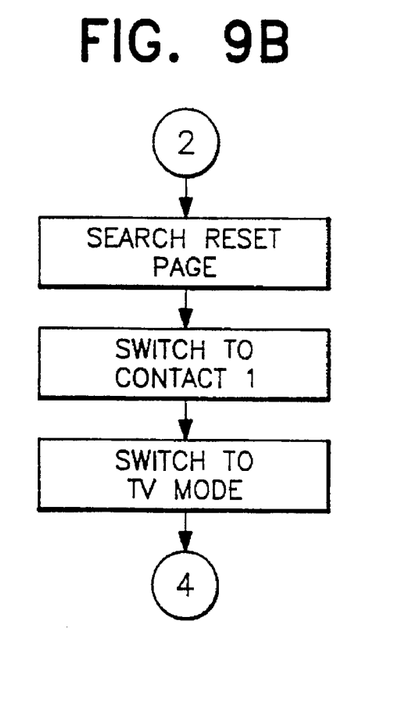
Figure 9C:
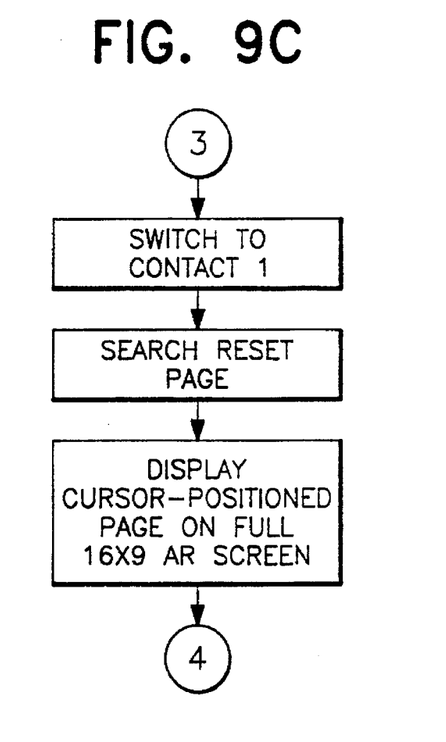
Figure 9D:
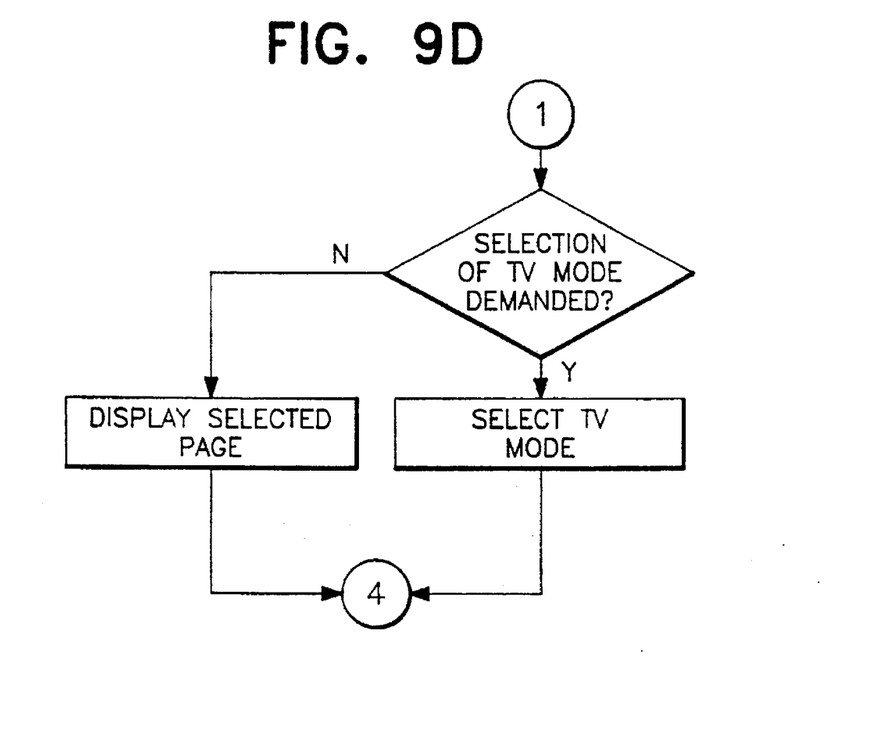

Referring to FIGS. 7, 9A, and 9B, if a user enters data corresponding to the teletext page number he intends to search to the microcomputer 84, the microcomputer 84 receives pages from the first page (usually, a 100th page) to the extent that they can be stored at the page memory, and thereafter demands the control section 85 to store the received pages in the first memory 83. The control section 85 subsequently demands the receiving section 86 to receive the pages, and simultaneously demands the memory interface section 87 to store data provided from the receiving section 86 at the allocated memory region in the second memory 88.

Like the foregoing, when storing of the pages is completed, the control section 85 provides a receiving-done signal to the microcomputer 84, and accordingly, the microcomputer 84 reads the received page numbers, creates a page list, and accordingly demands the control section 85 to store the page list in the second memory 88.

Thereafter, the microcomputer 84 demands the control section 85 to display the pages and the page list as shown in FIGS. 8A to 8D. At this time, a cursor is located at the first page number, and the contents of a cursor-located page is displayed on the topmost region of the three auxiliary regions.

The control section 85 switches the common contact of a switch 89 to a contact 2, demands the memory interface section 87 to output the first page stored in the first memory 83, and simultaneously demands the character generator 50 to display a page search mode, informing a display position on the screen.

The character generator 50 displays the page list being provided to its port P1 on a 4×3 A.R. region, and displays the page data being provided to its port P2 with it enlarged two times on one of the auxiliary regions designated by the control section 85.

Meanwhile, if a user's demand for cursor movement is requested in the page search mode, the microcomputer 84 demands the control section 85 to move a cursor, and to display a cursor-located page on the next auxiliary region. The control section 85 determines the location of the memory where the cursor-located page is stored, and demands the memory interface section 87 to output the contents of the memory. Besides, the control section 85 alternates the cursor location, stores the cursor-location-alternated page at the second memory 88, and demands the character generator 50 to display the page data being provided to its port P2 on the next auxiliary region.

Similarly, if a user's demand for enlargement of the page on the current auxiliary region is requested in the page search mode, the microcomputer 84 demands the control section 85 to display the page on the current auxiliary region in a normal mode. Thereby, the control section 85 switches the common contact of the switch 89 to a contact 1, and demands the character generator 50 to display the page in a normal mode. At this time, the character generator 50 eliminates the auxiliary regions, and displays the page data being provided to its port P1 on the full screen.

Alternatively, if a user's demand for and of page search is requested in a page search mode, the microcomputer 84 demands the control section 85 to stop displaying the page in a teletext mode. Thereby, the control section 85 switches the common contact of the switch 89 to the contact 1, and demands the character generator 50 to display nothing. If the teletext is not displayed, a television image signal is displayed on the screen.

Figure 10:
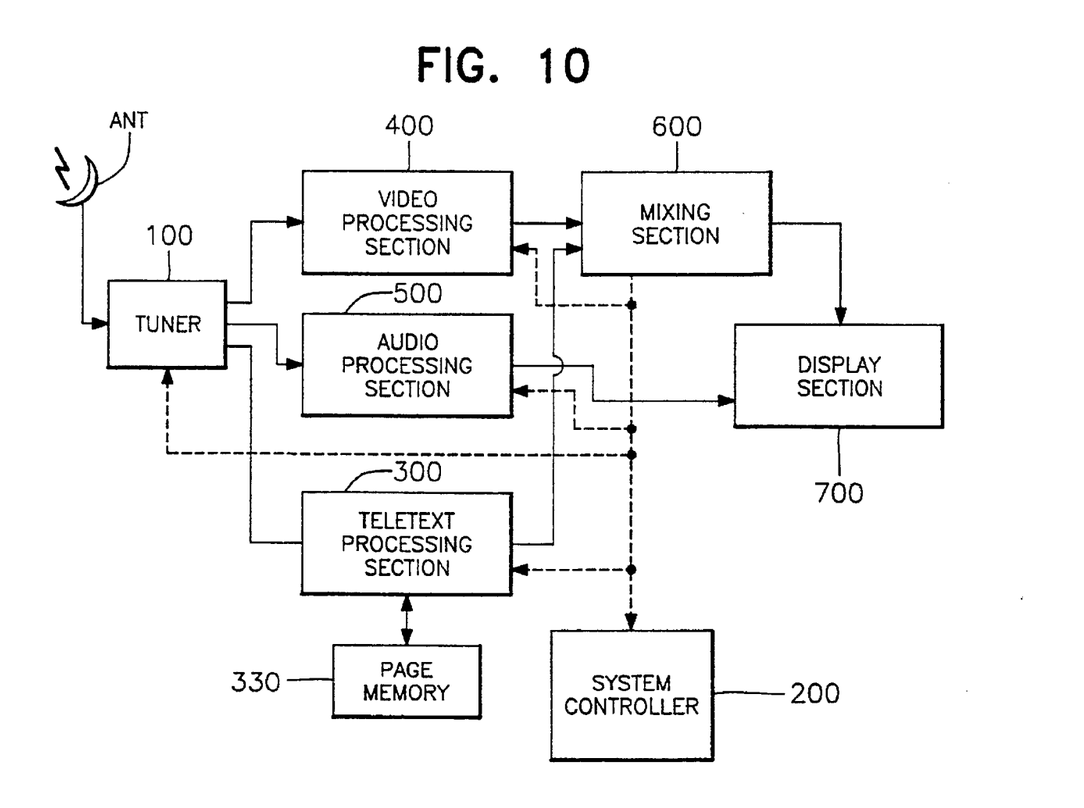
FIG. 10 is a block diagram of the apparatus for performing the teletext information displaying method according to still another embodiment of the present invention.
Figure 11:
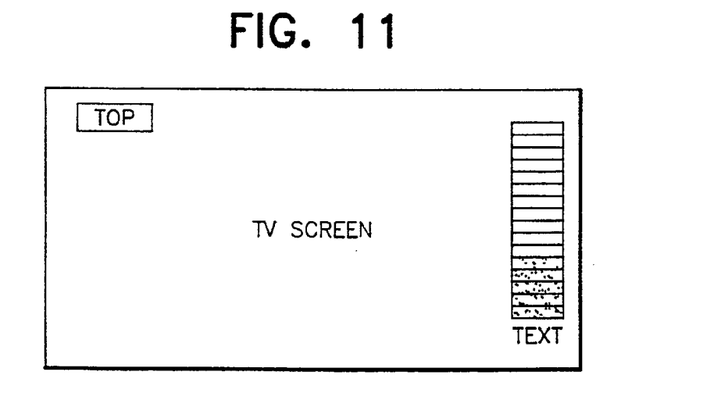
FIG. 11 is a view showing the teletext information displayed on a 16×9 A.R. screen with a television picture by the teletext information displaying method according to still another embodiment of the present invention.
Figure 12:
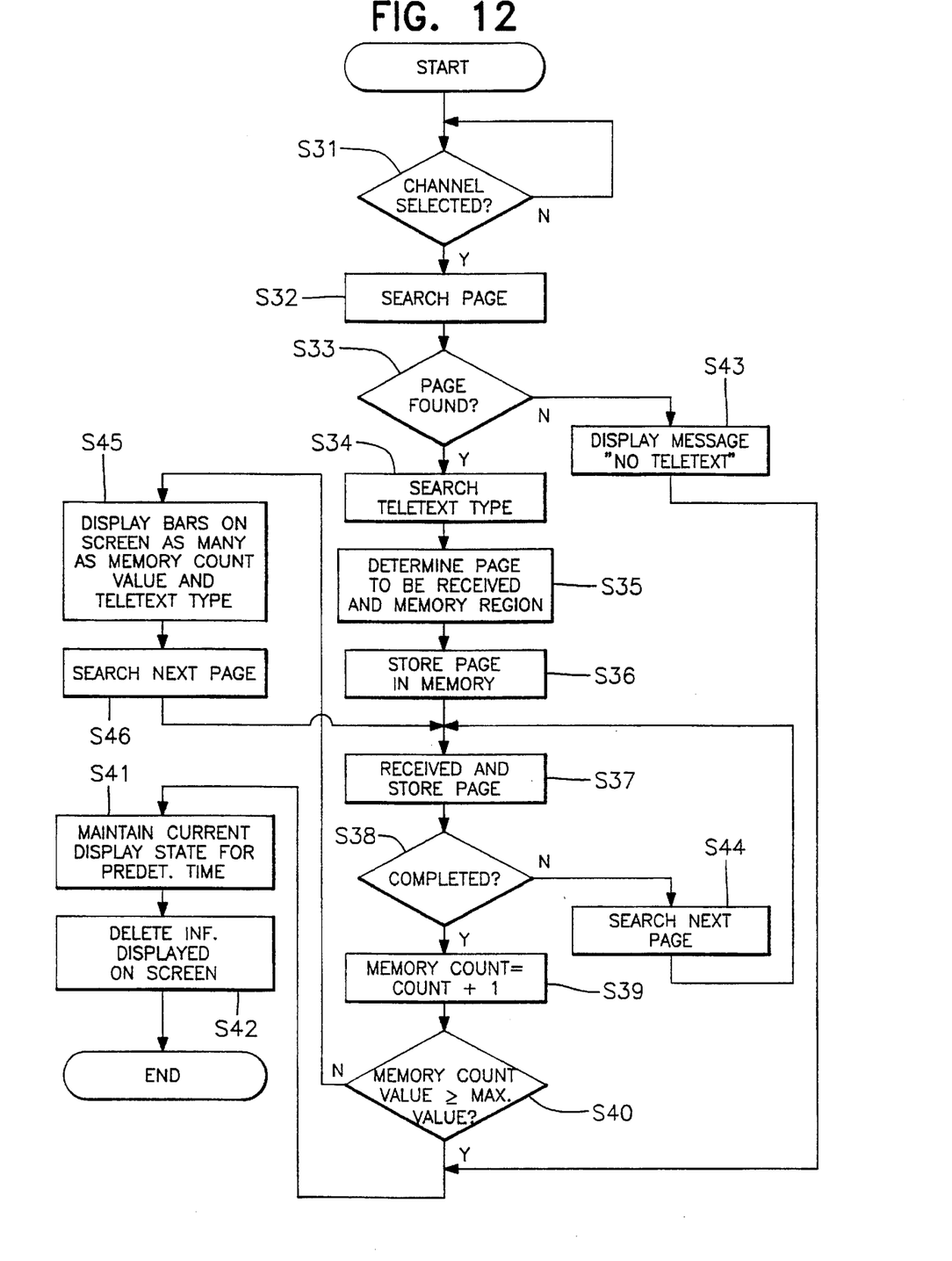
FIG. 12 is an algorithmic diagram explaining the teletext information displaying method according to still another embodiment of the present invention.

Lastly, the teletext information display method according to still another embodiment of the present invention will be discussed with reference to FIGS. 10 to 12. FIG. 10 is a block diagram of the teletext information displaying apparatus for performing the method according the present invention. FIG. 11 is a view showing the received teletext type and page receiving level displayed on the screen in bar-shape. FIG. 12 is an algorithmic diagram explaining the teletext information displaying method according to still another embodiment of the present invention.

With reference to FIG. 10, if a channel section demand data is entered in a system controller 200, the system controller 200 provides a tuning control signal to a tuner 100. The tuner 100 tunes a broadcast signal received by an antenna, and provides the tuned signal to a video processing section 400, to an audio processing section 500, and to a teletext processing section 300. The teletext processing section 300 extracts teletext data from the tuned signal, either stores the teletext data in a page memory 330 or provides the stored data to a mixing section 600. The mixing section 600 mixes the stored data with a video signal from the video processing section 400, and outputs the mixed signal to a display section 700.

With reference to FIGS. 10 and 12, it is judged whether or not the channel selection data is entered to the system controller 200 (step S31). If the channel selection data is entered, it is searched whether or not the teletext page is provided from the teletext processing section 300 (step S32), and thereby it is checked whether the page is provided (step S33).

Thereafter, if the page is provided at step S33, the teletext type is determined by analyzing the teletext signal inputted to the teletext processing section 300 (step S34), the page to be received and a memory region is determined (step S34), the received page is provided to the page memory 330 (step S36), and the corresponding page is received and stored (step S37).

Subsequently, it is checked whether the page has been received and stored (step S38), and if the page has been received, the memory count value is increased by 1 (step S39), and it is determined whether the memory count value is the maximum value (i.e., the maximum capacity of the page memory) (step S40).

If the memory count value is equal to or greater than the maximum value, the teletext type and the page receiving level is displayed for a predetermined time (step S41) as shown in FIG. 11, and then the information displayed on the screen is eliminated (step S42).

Meanwhile, if the page is not received at step S33, the message "NO TELETEXT" is displayed (step S43) and then step S41 is performed. If the page is not received at step S38, the next page is searched as in step S44, and returns to step S37 for receiving and storing the page.

If the memory count value is less than the maximum value at step S40, bars, the number of which is as much as the memory count value, are displayed with the teletext type as shown in FIG. 11 and then step S37 is performed.

From the foregoing, the present invention provides the advantages that a user can easily find out desired teletext information by checking whether the teletext page information entered by the user is received, and effectively displays the contents and information of the corresponding page on the screen. The user can carry out an easy page search by displaying the contents of a cursor-located page on the auxiliary region of the 16×9 A.R. screen, simultaneously while displaying the teletext page list on the 4×3 A.R. region of the 16×9 A.R. screen. Also, a user need not change the present mode to a teletext mode to recognize the teletext type since the type and receiving condition of the received teletext is displayed on the screen during selection of a channel.

While the present invention has been described and illustrated herein with reference to the preferred embodiments thereof, it will be understood by those skilled in the art that various changes in form and details may be made therein without departing from the spirit and scope and the invention.

What is claimed is:

1. A teletext information displaying method for a wide-screen television receiver, comprising the steps of:

automatically checking whether a corresponding teletext page number is received by the receiver when the page number is selectively inputted by a user;

automatically storing the page number in a first memory location when the page number is received;

automatically checking whether an information page corresponding to the page number is received or not, automatically decoding the information page if the information page is received, and automatically forming and storing a display page in a second memory location, said display page corresponding to said information page after decoding; and automatically displaying the page number on a 4×3 aspect ration (A.R.) region of a 16×9 A.R. screen, and automatically displaying the display page on a remainder region of the 16×9 A.R. screen.

2. A teletext information displaying method for a wide-screen television receiver, comprising the steps of:

discriminating whether teletext pages are received if a page search is demanded by a user, automatically displaying a "no teletext" message if the teletext pages are not received, automatically receiving and storing the teletext pages if the teletext pages are received, automatically creating a page list of received page numbers and displaying the page list on a 4×3 aspect ratio (A.R.) region of a 16×9 A.R. screen and automatically displaying a first teletext page listed in the page list on a remainder region of the 16×9 A.R. screen;

displaying on the remainder region of the 16×9 A.R. screen a particular page selected by movement of a cursor on the list at each display step;

displaying the particular page selected on the full 16×9 A.R. screen if enlargement of the page is demanded by the user at each display step; and stopping the page search if page search finish data is inputted at each display step, and switching over to a television mode for displaying an input video signal.

3. The teletext information displaying method of claim 1, wherein said step of checking whether a corresponding teletext page number is received when the page number is inputted by a user further comprises the steps of:

clearing a counter in a teletext information processing section;

incrementing said counter up to a maximum value;

determining whether said corresponding teletext page is received after incrementing said counter; and storing a message indicating that no corresponding teletext page was received if said counter is incremented up to said maximum value without receiving said page.

4. A teletext information displaying method for a wide-screen television receiver, comprising the steps of:

discriminating whether teletext pages are received if a page search is demanded by a user, automatically receiving and storing the teletext pages if the teletext pages are received, automatically creating a page list of received page numbers and displaying the page list on a 4×3 aspect ratio (A.R.) region of a 16×9 A.R. screen and displaying a first teletext page listed in the page list on a remainder region of the 16×9 A.R. screen; and displaying on the remainder region of the 16×9 A.R. screen a particular page selected by movement of a cursor on the list at each display step.

5. The teletext information displaying method of claim 4, further comprising the steps of:

automatically displaying a "no teletext" message if the teletext pages are not received, at the discriminating step;

displaying the particular page selected on the full 16×9 A.R. screen if enlargement of the page is demanded by the user at each display step; and stopping the page search if page search finish data is inputted at each display step, and switching over to a television mode for displaying an input video signal.

6. A teletext information displaying method for a wide-screen television receiver, comprising the steps of:

discriminating whether teletext pages are received if a page search is demanded by a user;

automatically receiving and storing the teletext pages if the teletext pages are received;

automatically creating a page list of received page numbers and displaying the page list on a 4×9 aspect ratio (A.R.) region of a 16×9 A.R. screen, and displaying a first teletext page listed in the page list on a remainder region of the 16×9 A.R. screen; and displaying on the remainder of the 16×9 A.R. screen a particular page selected by movement of a cursor on the list at each display step.

* * * * *